United States Patent

Morita et al.

(10) Patent No.: US 7,206,695 B2
(45) Date of Patent: Apr. 17, 2007

(54) NAVIGATION APPARATUS

(75) Inventors: Hiroyuki Morita, Saitama (JP); Shinichi Kawada, Niigata (JP); Eiichi Murohashi, Niigata (JP)

(73) Assignees: Nippon Seiki Co., Ltd., Niigata (JP); Honda Giken Kogyo Co., Ltd., Tokyo (JP)

( * ) Notice: Subject to any disclaimer, the term of this patent is extended or adjusted under 35 U.S.C. 154(b) by 72 days.

(21) Appl. No.: 10/474,361

(22) PCT Filed: Dec. 9, 2002

(86) PCT No.: PCT/JP02/12875

§ 371 (c)(1),
(2), (4) Date: Oct. 9, 2003

(87) PCT Pub. No.: WO03/052678

PCT Pub. Date: Jul. 10, 2003

(65) Prior Publication Data

US 2004/0128061 A1  Jul. 1, 2004

(30) Foreign Application Priority Data

Dec. 26, 2001 (JP) ............... 2001-395087
Dec. 26, 2001 (JP) ............... 2001-395088

(51) Int. Cl.
*G08G 1/137* (2006.01)
*G01C 21/34* (2006.01)
*G01S 5/00* (2006.01)
*G08G 1/123* (2006.01)

(52) U.S. Cl. ............... 701/210; 701/200; 701/207; 340/995.14; 340/995.24; 340/995.27

(58) Field of Classification Search ............. 701/212, 701/206, 210; 340/995.17, 995.15, 995.27, 340/995.24, 995.2, 995.14
See application file for complete search history.

(56) References Cited

U.S. PATENT DOCUMENTS

| | | | | |
|---|---|---|---|---|
| 5,452,217 A | * | 9/1995 | Kishi et al. | 701/207 |
| 5,475,599 A | * | 12/1995 | Yokoyama et al. | 701/211 |
| 5,523,765 A | * | 6/1996 | Ichikawa | 342/451 |
| 5,832,406 A | * | 11/1998 | Iwami et al. | 701/202 |
| 5,936,553 A | * | 8/1999 | Kabel | 340/995.14 |
| 6,057,786 A | * | 5/2000 | Briffe et al. | 340/975 |
| 6,157,890 A | * | 12/2000 | Nakai et al. | 701/200 |
| 6,249,744 B1 | * | 6/2001 | Morita | 701/213 |
| 6,321,160 B1 | * | 11/2001 | Takahashi | 701/209 |
| 6,487,496 B2 | * | 11/2002 | Katayama et al. | 701/209 |
| 6,574,552 B2 | * | 6/2003 | Yano et al. | 701/209 |
| 6,751,551 B2 | * | 6/2004 | Katayama et al. | 701/211 |
| 2002/0165668 A1 | * | 11/2002 | Yamashita et al. | 701/211 |
| 2002/0173906 A1 | * | 11/2002 | Muramatsu | 701/207 |
| 2003/0060971 A1 | * | 3/2003 | Millington et al. | 701/206 |

FOREIGN PATENT DOCUMENTS

| | | |
|---|---|---|
| JP | 7-128080 | 5/1995 |
| JP | 09-152349 | 6/1997 |
| JP | 10-20776 | 1/1998 |

(Continued)

*Primary Examiner*—Thomas Black
*Assistant Examiner*—Christine M. Behncke
(74) *Attorney, Agent, or Firm*—McDermott Will & Emery LLP (57) ABSTRACT

A current place indicating icon a for indicating the current place of a user, a used road image b for indicating a used road being followed by the user, an option road image c for indicating an option road connected to the used road and located in front of the current place in the traveling direction, and a way point indicating icon d set by the user and located in front of the current place in the traveling direction are displayed in the screen X of a display unit 7.

6 Claims, 5 Drawing Sheets

FOREIGN PATENT DOCUMENTS

| | | |
|---|---|---|
| JP | 10-122877 | 5/1998 |
| JP | 11-295096 | 10/1999 |
| JP | 11-327580 | 11/1999 |
| JP | 2001-71966 | 3/2001 |
| JP | P2001-82973 | 3/2001 |
| JP | P2001-165695 | 6/2001 |
| JP | P2001-256595 | 9/2001 |

* cited by examiner

NAVIGATION APPARATUS

TECHNICAL FIELD

The present invention relates to a navigation system to be utilized for guiding a mover such as a human being or a vehicle.

BACKGROUND ART

The navigation system to be utilized for the route guide of the mover such as the human being or the vehicle by displaying information on at least the current place of a user is practiced such that pieces of information such as a symbol indicating the current place (i.e., the aforementioned "information on the current place"), a route to be followed, a destination, an azimuth or a scale are overlapped and displayed on a map. The display mode includes a current place centralized display mode, in which the current place is arranged generally at the center of the display unit, and a front-wide display mode for displaying the front in the traveling direction widely. In each of the modes, moreover, it is known that the display is made by combining a north-up display mode, in which the azimuth "north" is displayed up, or a heading-up display mode in which the traveling direction is displayed up (as referred to JP-A-10-20776, for example).

In the case of the construction, in which the current place, the followed route and soon are superposed and displayed on a map having place names, road names, river names, railway line names, major building names and so on, the ratio of information to a display area, i.e., the screen of the display unit having a size of 5 inches to 7 inches is excessive and has room for improvement in visibility.

Moreover, the front-wide display mode is a convenient one for confirming the information or followed route on a region to be passed through. However, the display mode is fixed, and the display change in the display unit is so poor that an attention calling power at the time when a way point such as an intersection or a destination is approached, thereby to leave room for improvement in conveniences.

The present invention has been conceived in view of such problems and has an object to provide a navigation system, which is improved in the visibility and-the conveniences.

DISCLOSURE OF THE INVENTION

As set forth in Claim 1, a navigation system of the present invention is characterized in that a current place indicating icon for indicating the current place of a user, a used road image for indicating a used road being followed by the user, an option road image for indicating an option road connected to the used road and located in front of the current place in the traveling direction, in a display shape different from that of the used road image, and a way point indicating icon for indicating a way point set by the user and located in front of the current place in the traveling direction are displayed in a common screen.

Especially in Claim 1, as set forth in Claim 2, the navigation system is characterized in that: the current place indicating icon is positioned at a portion below the vertical center of the screen; in that the front in the traveling direction is displayed above the current place indicating icon; and in that the current place indicating icon is displayed such that it does not change at its location or in its direction in the screen but stands still at the portion even if the current place changes, until at least the way point indicating icon is displayed in the screen.

According to the inventions as set forth in Claim 1 and Claim 2, it is possible to provide a navigation system, which is enabled to suppress the ratio of the information in the screen thereby to improve the visibility and the conveniences, by displaying mainly the current place indicating icon, the used road image, the option road image and the way point indicating icon in the screen.

As set forth in Claim 3, moreover, the navigation system is characterized: in that a current place indicating icon for indicating the current place of a user, a used road image for indicating a used road being followed by the user, an option road image for indicating an option road connected to the used road and located in front of the current place in the traveling direction, in a display shape different from that of the used road image, and a way point indicating icon for indicating a way point set by the user and located in front of the current place in the traveling direction are displayed in a common screen; in that the way point indicating icon moves toward a predetermined portion of the screen, as the current place approaches the way point, and stands still at the predetermined portion; and in that the current place indicating icon then moves on the used road image toward the way point indicating icon.

Especially in Claim 3, as set forth in Claim 4, the navigation system is characterized in that, in case the distance between the current place and the way point comes within a predetermined distance, the way point indicating icon is fixed and displayed at a predetermined portion of the screen.

Especially in Claim 3, as set forth in Claim 5, the navigation system is characterized in that, when the current place passes through the way point, the current place indicating icon is displayed at the indication of the way point passage until a predetermined time period or a predetermined distance passes.

According to the inventions as set forth in from Claim 3 to Claim 5, it is possible to provide a navigation system, in which the display mode at the time when the way point is approached is different from the ordinary display mode so that the attention calling power at the time when the way point is approached is intensified to improve the visibility and the conveniences.

Especially in Claim 1 or Claim 3, as set forth in Claim 6, the navigation system is characterized in that, in case the current place departs from the used road, a locus image indicating a history of the current place is displayed at the back of the current place indicating icon.

Especially in Claim 6, as set forth in Claim 7, the navigation system is characterized in that the display mode of the screen of the case, in which the current place deviates from the used road, is different from that of the case, in which the user is moving on the used road.

According to the inventions as set forth in Claim 6 and Claim 7, it is possible to provide a navigation system, in which the display mode of the screen is seriously different depending on whether a regular route is being followed, so that the attention calling power at the time when the regular route is approached, thereby to improve the visibility and the conveniences.

As set forth in Claim 8, moreover, the navigation system is characterized in that a current place indicating icon staying at a predetermined position even if the current place of a user changes, azimuth information on an azimuth within a predetermined range in front of the traveling direction around the current place, and guide information on an azimuth of the traveling direction at the current place and a way point set by the user are displayed in a common screen.

Especially in Claim 8, as set forth in Claim 9, the navigation system is characterized in that the azimuth information, the current place indicating icon and the guide information are displayed in the screen such that: the azimuth information is arranged in the horizontal direction of the screen; the current place indicating icon is arranged over or near the azimuth information; and the guide information is arranged above the azimuth information.

Especially in Claim 8 or Claim 9, as set forth in Claim 10, the navigation system is characterized in that the guide information has different display shapes between the case, in which the way point is located within the predetermined range with respect to the current place, and the remaining cases.;

According to the inventions as set forth in Claim 8 to Claim 10, it is possible to provide a navigation system, in which an auxiliary display for transmitting the positional relation between the current place and the way point is made by displaying the current place indicating icon, the guide information and the azimuth information mainly in the screen, thereby to improve the visibility and the conveniences effective for reducing the mental load on the user.

As set forth in Claim 11, moreover, the navigation system is characterized in that a current place indicating icon, which stands still even if the current place of a user changes, and travel information on the direction of a way point, which is located around the current place indicating icon and set by the user, are displayed in a common screen.

Especially in claim 11, as set forth in Claim 12, the navigation system is characterized in that the travel information is composed of a plurality of breakpoint marks, which divide a predetermined angle range at least in front of the traveling direction around the current place and can indicate the direction of the way point.

Especially in Claim 12, as set forth in Claim 13, the navigation system is characterized in that the direction of the way point is indicated with one or adjacent two of the breakpoint marks.

According to the inventions as set forth in Claim 11 to Claim 13, it is possible to provide a navigation system, in which an auxiliary display for transmitting a positional relation between the current place and the way point is made by displaying the current place indicating icon, the guide information and the azimuth information mainly in the screen, thereby to improve the visibility and the conveniences effective for reducing the mental load on the user.

BEST MORE FOR CARRYING OUT THE INVENTION

The present invention will be described in connection with an embodiment shown in the accompanying drawings.

Figure 1:
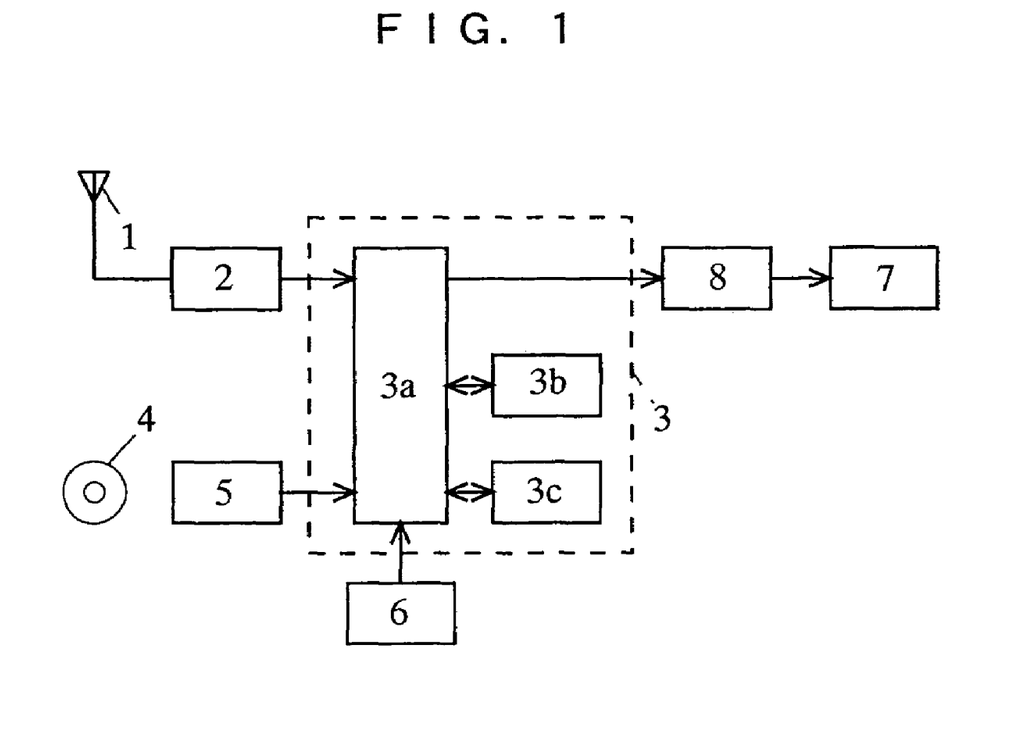
FIG. 1 is block diagram for explaining a construction of a navigation system.

FIG. 1 is a block diagram for explaining a construction of the embodiment of the present invention. This embodiment is constructed of: an antenna 1 for receiving signals from a positioning satellite for the GPS; a receiver unit 2 for fetching those signals for a predetermined period, to modulate/demodulate their frequencies thereby to operate and output positional data such as the latitude, longitude, traveling direction (as also called azimuth or angle) and altitude of the position of reception; a control unit 3 for determining positional data on the current place of a mover or user by inputting and operating the output signals from the receiver unit 2; a read unit 5 for reading display data around the current place and on map data such as maps, topographic maps, roads, rivers and place names, in accordance with the positional data of the control unit from a storage medium 4 such as a CD-ROM storing those map data; an input unit 6 such as a keyboard or switches operated by the user to input various settings to the control unit 3; and a display unit 7 made of an LCD for displaying pieces of information such as a current place, a destination, a route to be followed, an azimuth or a scale by using the display data based on the positional data of the control unit 3. 8 is a driver circuit for driving the display unit 7, located between the control unit 3 and the display unit 7.

In the so-called "GPS type" navigation system to be disclosed in this embodiment, the antenna 1, the receiver unit 2 and the control unit 3 make position detecting means for detecting the situations of the current place or the like of the user. In either the so-called "self-contained navigation type" navigation system or the so-called "hybrid type" navigation system using the second-contained type and the GPS together, however, various sensors such as a velocity sensor and an azimuth sensor, and an operation unit such as a microcomputer for the operations. The actions of the operation unit can be alternatively done by a CPU 3a of the control unit 3.

The control unit 3 is constructed of the well-known microcomputer (or micom), which is composed of the CPU 3a, a ROM 3b and a RAM 3c and so on. On the basis of programs stored in advance in the ROM 3b, the CPU 3a performs predetermined operations on the various data stored in the RAM 3c, to determine the positional data.

Here, in the construction that either the map data (or the aforementioned display data) stored in the CD-ROM or DVD-ROM are fetched or from an external unit such as a personal computer or the map data (or the aforementioned display data) are down-loaded from a remote server through communication lines, and are stored in a storage element (i.e., a mobile semiconductor element, as called "flash memory", "memory stick" or "memory IC"), that storage element corresponds to the storage medium 4. In this construction, the CPU 3a of the control unit 3 plays the role of the read unit 5, and the storage medium 4 and the read unit 5, or their alternatives make display data creating means for creating the display data to be displayed in the display unit 7 and providing a basis for the information to be described hereinafter.

Next, specific displays in the display unit 7 will be described with reference to FIG. 2 to FIG. 7.

The display device 7 has a screen X or a transversely long rectangular display area. This screen X displays various pieces of information. These pieces of information are constructed by combining data, which are extracted from the data extracted from the display data and the various data stored in the RAM 3c. The pieces of information are exemplified by: a current place indicating icon a of a general arrow shape for indicating the current place of the user; a used road image b of thick lines for indicating a road being followed by the user; an option road image c of a thin line for indicating an option road connected to the used road and located in front of the current place in the traveling direction; and a way point indicating icon d of a circle shape indicating an intersection between the used road and the option road, for example, as set by the user and located in front of the current place in the traveling direction.

The way point is used as a mark point such as the destination or a check point. Moreover, the traveling direction covers not only the forward direction during an actual movement but also the direction in which the user faces at an unmoving time.

Figure 2:
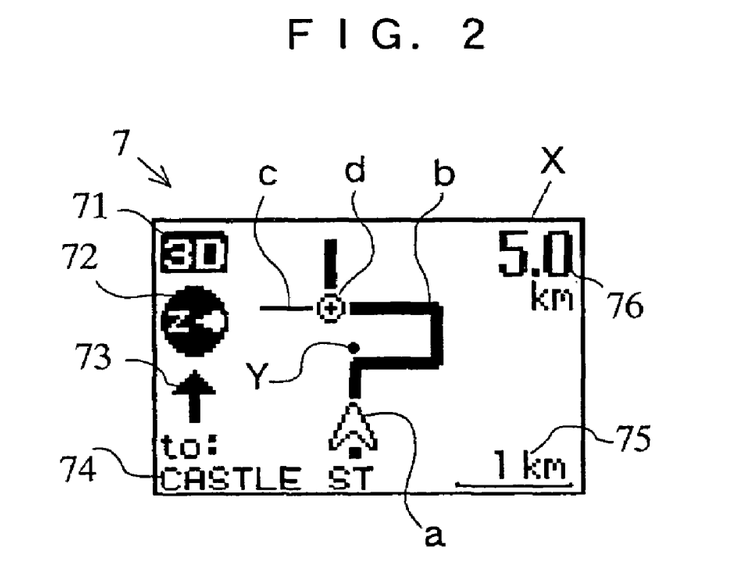
FIG. 2 to FIG. 7 are explanatory views for explaining displays in the navigation system.

FIG. 2 shows a display example in an ordinary state. The current place indicating icon a is displayed in the so-called "front-wide display mode" and in the "heading-up display mode". In these display modes, the current place indicating icon a is so positioned at a portion below the vertical center of the screen X, e.g., at a one-third upper portion from the lower end of the screen X in the vertical direction that it may be positioned slightly below the center Y of the screen X. At the same time, the front in the traveling direction is displayed above the current place indicating icon a, and this current place indicating icon a does not change at its location or in its direction in the screen X but stands still at the portion even if the current place changes, until at least the way point indicating icon d is displayed in the screen X. Here in FIG. 2, the current place indicating icon a is displayed to take a position generally at a transversely intermediate portion of the screen X but may be displayed with a leftward or rightward shift depending upon the later-described relation to other display items.

The used road image b is displayed substantially all over the screen X, and the current place display icon a is displayed over that used road image b. The used road, as meant by this display, implies the road, which is selected as a travel-planned route, as retrieved and set in advance with a route guiding function or the like by the user, from the starting place to the destination.

The option road image c is so displayed thinner than the used road image b as may take a display shape different from the used road image b. The option road image c is not displayed in the screen X, not only in case it does not exist within a predetermined range displayed in the screen X in front of the current place in the traveling direction, but also in case it exists at the back of the current place in the traveling direction.

Here in the navigation system of this kind, there is a publication of the prior art (e.g., JP-A-2001-255159), in which the visibility of a guide display is improved to recognize the course easily at a guide point by making the display at a predetermined point of the route excepting the roads unnecessary for the guide.

The present embodiment of the present invention and the prior art publication are common in that the display of the roads other than the option road (i.e., the road of the aforementioned prior art publication) connected to the used road (i.e., the guide road of the aforementioned prior art publication) is limited. However, what is done in the latter is to limit the display, whereas the former makes the display shapes different between the used road and the option road, in addition to the limit to the display, so that it is more useful for improving the visibility.

The way point display icon d is not displayed not only in the screen X in case it does not exist within a predetermined range displayed in the screen X in front of the current place in the traveling direction, but also in case it exists at the back of the current place in the traveling direction. Moreover, the way point display icon d is not essential for the pieces of information. It is possible to select whether or not the way point display icon d is displayed, and it is arbitrary to leave the icon d undisplayed.

In addition to the pieces of information, the other display items are simultaneously or selectively displayed in the screen X, such as a satellite receiving situation 71, a traveling direction (or compass) 72, a travel guide 73, a current place name 74, a distance scale (or scale) 75 and a residual distance 76 to the next one of the way points.

In this display mode, the current place display icon a is displayed while standing still at the identical place without changing in the position or direction in accordance with the change in the current place, so that the current place display icon a in the screen X can be easily recognized to improve the visibility. When the actual surrounding landscape and the screen X are compared, the point of arrival of the current place in the near future can be easily estimated.

Figure 3:
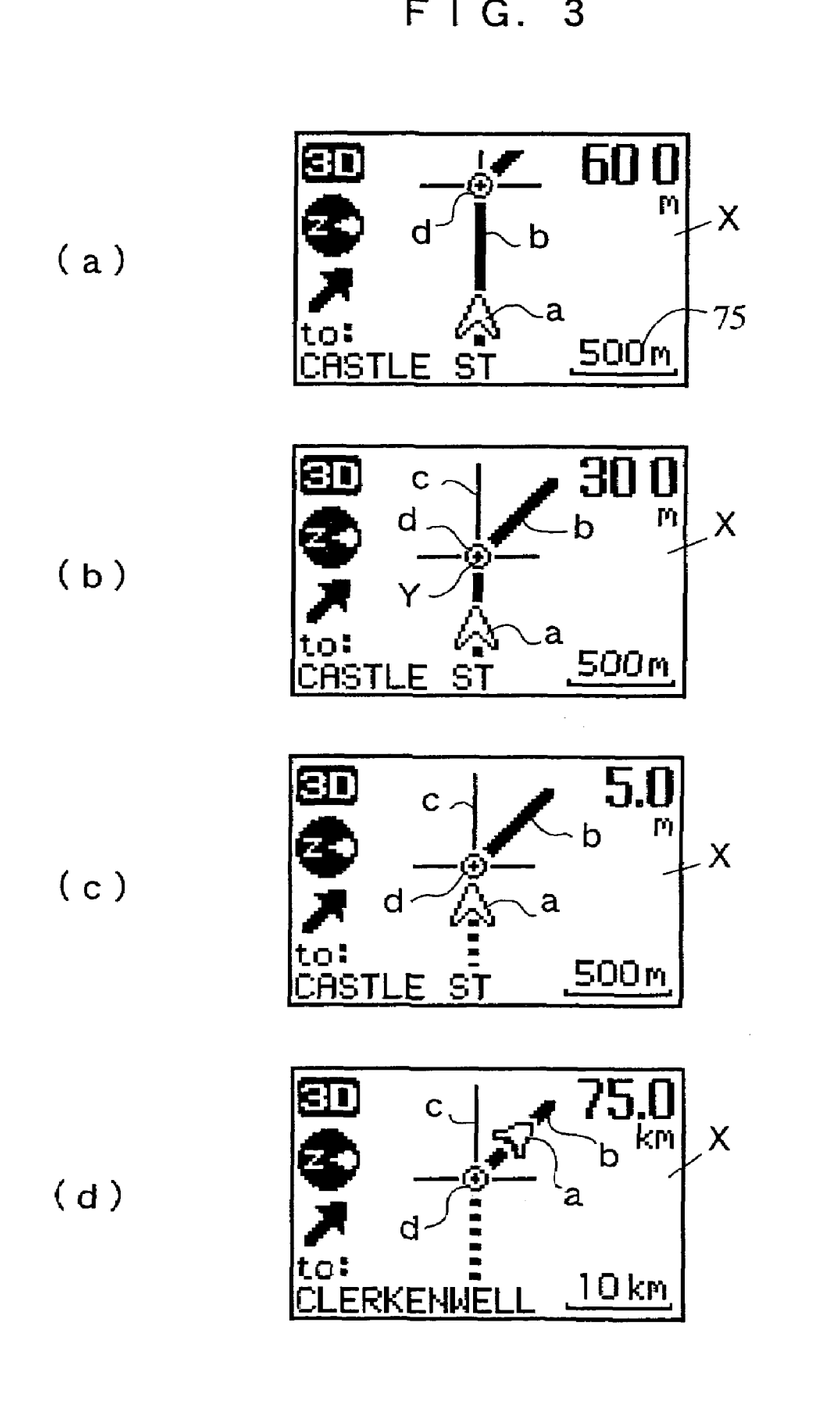

FIG. 3 shows the case, in which the distance of the current place from the way point is becoming short. When the distance between the current place and the way point can be displayed in the screen X in accordance with the scale 75, the way point indicating icon d is displayed together with the current place indicating icon a (FIG. 3(a)).

The way point indicating icon d moves to a predetermined portion of the screen X, as the current place approaches the way point, and stands still at the predetermined portion. From now on, the current place indicating icon a moves on the used road image b toward the way point indicating icon d. In case the distance between the current place and the way point comes within a predetermined distance such as 300 meters, the way point indicating icon d is fixed and displayed at a predetermined portion of the screen X, such as the center Y or near the center Y (FIG. 3(b)), and the current place indicating icon a is displayed to come gradually closer to the way point indicating icon d (FIG. 3(c)).

When the current place passes through the way point, the current place indicating icon a is displayed, as shown in FIG. 3(c), at the indication of the way point passage until a predetermined time period (e.g., 5 seconds) or a predetermined distance (e.g., 30 meters) passes. In this meanwhile, the display is cleared of the display of the ordinary state, i.e., the display (FIG. 3(d)) in which the heading-up display mode is combined with the front-wide display mode. As a result, the user can confirm the passage through the way point reliably.

After the elapse of the predetermined time period or the predetermined distance, the display mode restores the ordinary state, as shown in FIG. 3(a)), in which the display is made in the front-wide display mode and in the heading-up display mode.

In this display mode, the attention calling power at the time of approaching the way point is intensified to make it possible to be conscious of the driving preparations at the way point in advance with sufficient time so that the conveniences can be improved to confirm the situations of the current place easily.

Figure 4:
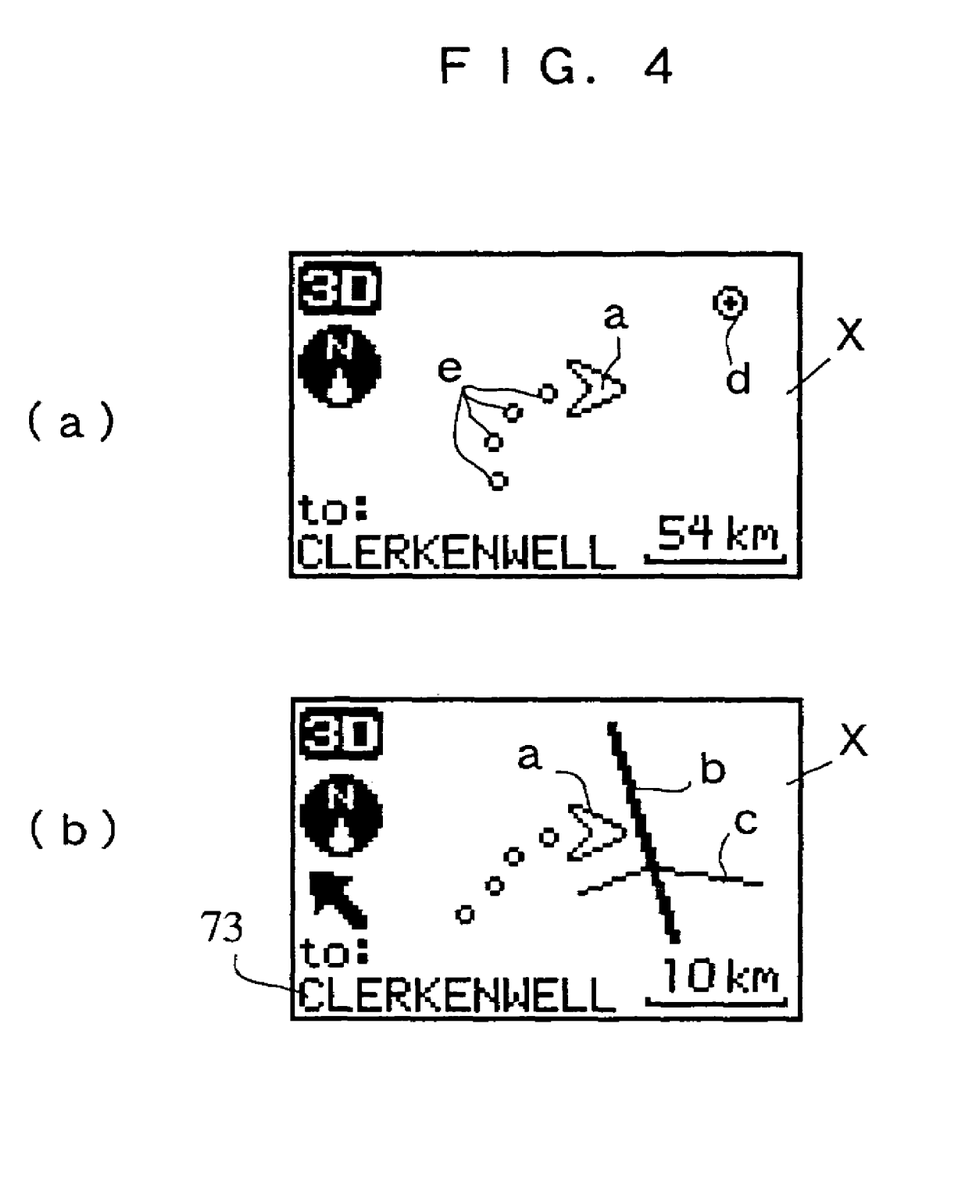

FIG. 4 shows a display example of an off-route state of the case, in which the current place departs from the used road. In this off-route state, the display mode, in which the user is traveling (in the ordinary state) on the used road, that is, in which the heading-up display mode is combined with the front-wide display mode, is released, and the display is made in a display mode different from that in the ordinary state, such as a north-up display mode (FIG. 4(a)). Here, letter e appearing in the same Figure designates a dotted locus image indicating the history of the current place, i.e. , the points of passage of past travel.

When the current place approaches the used road in this off-route state, the current place indicating icon a and the used road image b are displayed in the screen X, and then the direction from the current place to the next way point is indicated with the travel guide 73 (FIG. 4(b)). In this example, the travel guide 73 indicates that the next way point exists in a turning-left direction to be taken at the instant when the current place indicating icon a reaches the used road image b.

In this display mode, depending on whether or not the regular route is followed, the display mode of the screen X becomes so drastically different as to intensify the attention calling power at the time of approaching the regular route, so that the conveniences can be improved to confirm the situations of the current place easily. Moreover, the user does not stray but can grasp the direction to be taken when the regular route is recovered.

The present invention should not be limited to the embodiment thus far described but can be modified in various manners. In FIG. 4, for example, the option road image c or the way point indicating icon d need not always be displayed. It is possible to select whether or not the display is made, and it is arbitrary to make no display.

Moreover, the description has been made on the case, in which the heading-up display mode is combined with the front-wide display mode. Despite of this description, however, the present invention can also be applied to the case, in which the display is made by combining the north-up display mode indicating the due north up in the screen X or a target-up display indicating the way point up in the screen X is combined with the front-side display mode.

Figure 5:
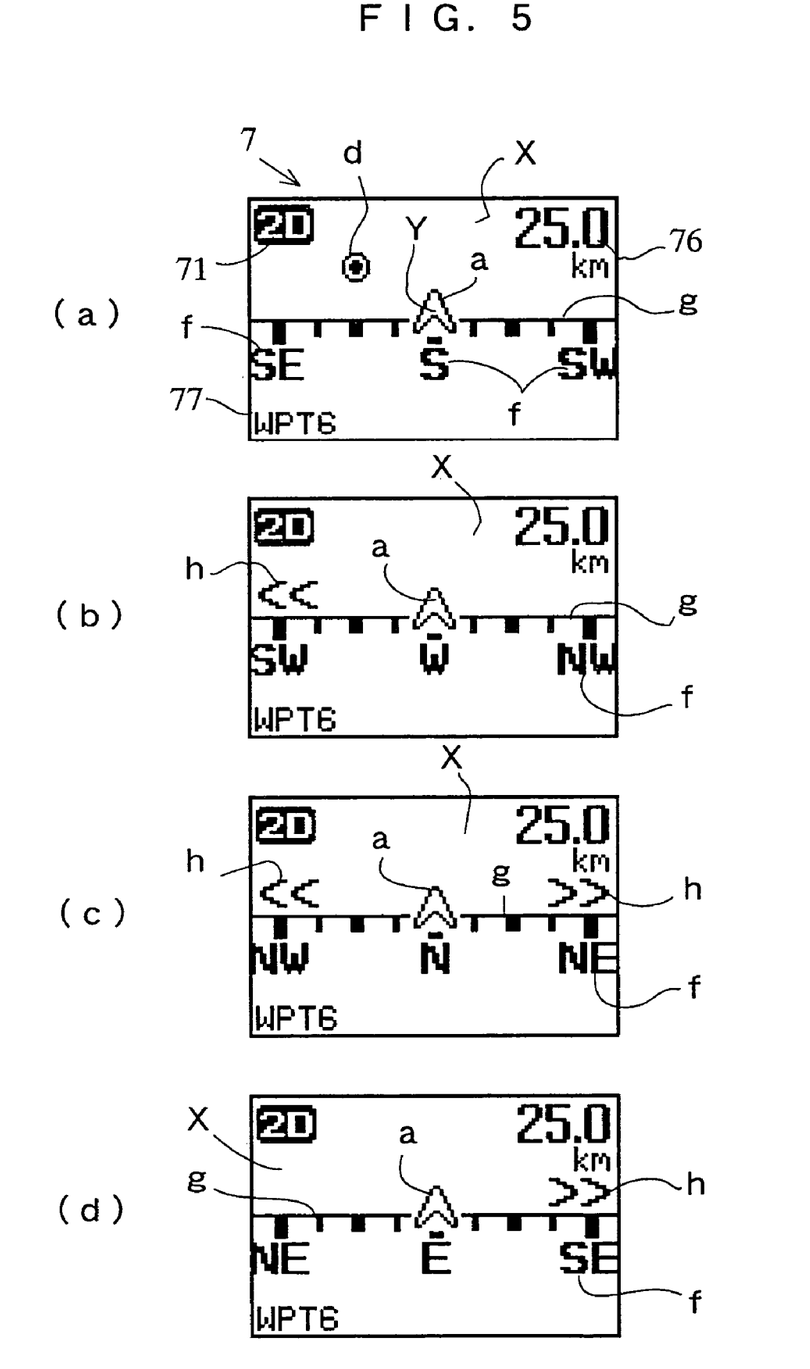

FIG. 5 shows a display example of the case of a compass mode, in which not the pieces of road information such as the used road image b and the option road image c but the current place indicating icon a, the later-described azimuth information and the later-described guide information are centrally displayed. The portions common to those of FIG. 2 are designated by the common reference characters.

In this compass mode, the current place indicating icon a staying at the predetermined position even if the current place of the user changes, the azimuth information on the azimuth within a predetermined range in front of the traveling direction around the current place, and the guide information on the azimuth of the traveling direction at the current place and the way point set by the user are displayed as the major display items in the common screen X.

The azimuth information is concerned with the azimuth within the predetermined range in front of the traveling direction around the current place. In FIG. 5 the azimuth within the range of clockwise and counter-clockwise 45 degrees in front of the traveling direction around the current place is composed of: symbols f of "N (north)", "NE (northeast)", "E (east)", "SE (southeast)", "S (south)", "SW (southwest)", "W (west)" and "NW (northwest)"; and a scale g dividing the whole azimuth (360 degrees) into 32 portions.

The guide information is concerned with the azimuth of the traveling direction at the current place and the way point. The way point indicating icon d forms, when displayed in the screen X, part of the guide information.

In case the traveling direction (or the front) is south and in case the way point is located south-southeast: the scale g is arranged in the horizontal direction generally at the center of the vertical direction of the screen X; the current place indicating icon a is located over that scale g and at the center Y in the screen X; the symbol f of "SE" and "SW" on the left-hand and right-hand sides below the scale g; the symbol f of "S" is displayed below the current place indicating icon a; and the way point indicating icon d is displayed intermediate of the symbol f of "S" and "SE" above the scale g (FIG. 5(a)). On the left-hand lower portion of the screen X, there is displayed a way point name 77 for specifying the way point.

In case the traveling direction is turned clockwise so that the front is located in the west: the symbol f of "SW" and "NW" on the left-hand and right-hand sides below the scale g is displayed; the symbol f of "W" is displayed below the current place indicating icon a; the way point is not contained in the display range (from southwest to northwest) of the screen X; but a guide mark h indicating that the way point exists in the leftward direction of the traveling direction (FIG. 5(b)). This guide mark h indicates the azimuth difference between the traveling direction and the way point at the current place, and forms part of the guide information.

In case the traveling direction is turned clockwise so that the front is located in the north, the symbol f of "NW" and "NE" on the left-hand and right-hand sides below the scale g is displayed, and the symbol f of "N" is displayed below the current place indicating icon a. In this case, the way point is not contained in the display range (from northwest to northeast) of the screen X but exists in a predetermined range (of 45 degrees, for example, from southeast to southwest) just at the back (i.e., south) of the traveling direction. Therefore, the way point can be displayed in the screen X by similar operations no matter whether the traveling direction might be turned clockwise or counter-clockwise, so that the guide marks h are displayed on the two ends of the scale g of the screen X (FIG. 5(c)). This guide mark h forms part of the guide information.

In case the traveling direction is turned clockwise so that the front is located in the east: the symbol f of "NE" and "SE" on the left-hand and right-hand sides below the scale g is displayed; the symbol f of "E" is displayed below the current place indicating icon a; the way point is not contained in the display range (from northeast to southeast) of the screen X; but a guide mark h indicating that the way point exists in the rightward direction of the traveling direction (FIG. 5(d)). This guide mark h forms part of the guide information.

Especially in an unfamiliar scene of a first place, it is a tendency of the navigation system that much attention is called to grasp the surrounding environment of the current place. An auxiliary display to transmit the positional relations between the current place and the way point is more effective for reducing the mental load on the user. Therefore, the navigation system has room for improvement in the conveniences.

With this construction, in the compass mode, not the road information such as the used road image b or the option road image c, but mainly the current place indicating icon a, the azimuth information and the guide information are displayed. By making the auxiliary display for transmitting the positional relation between the current place and the way point, therefore, it is possible to reduce the metal load on the user.

Moreover, the guide information is different between the display shape (i.e., the way point indicating icon d) of the case, in which the way point is located within the predetermined range with respect to the current place, and the display shape (i.e., the guide mark h) of the remaining cases. Therefore, the user does not stray but can grasp the direction to be taken, intuitively and easily.

Figure 6:
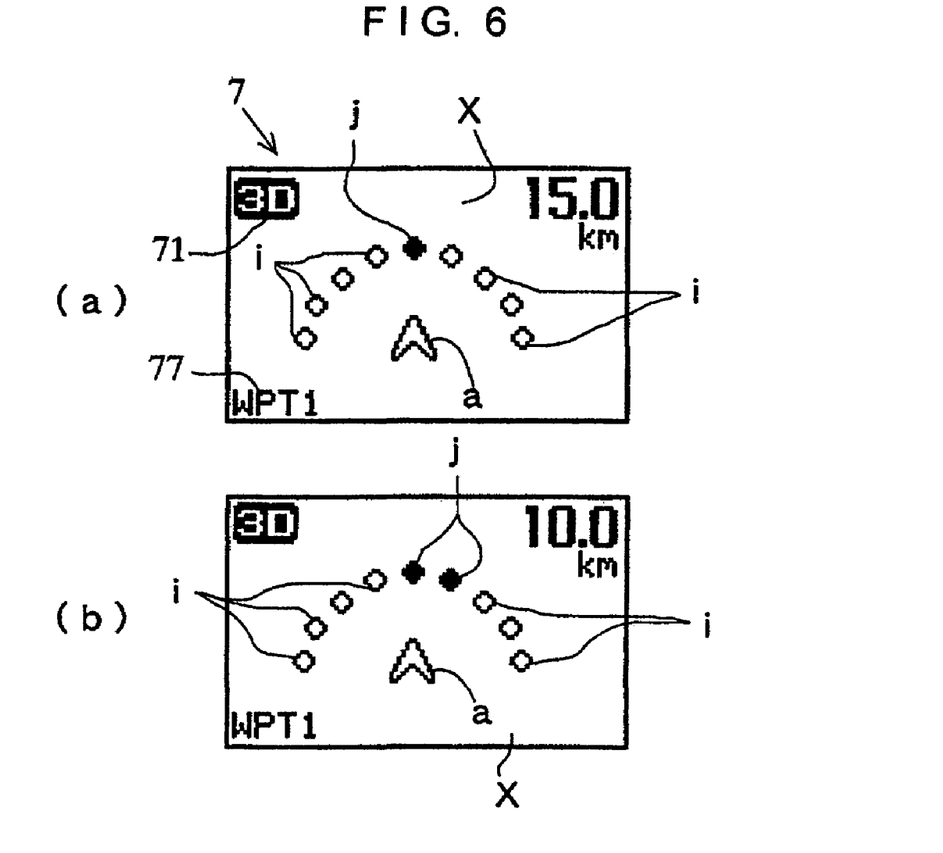

FIG. 6 shows a display example of the case in an arrow mode, in which not the road information such as the used road image b or the option road image c but the current place indicating icon a and the later-described travel information are centrally displayed. This arrow mode is a modification of the compass mode, and the same portions as those of FIG. 2 and FIG. 5 are designated at the common reference letters.

In this arrow mode, in the common screen X, the current place indicating icon a, which stands still even if the current place of the user changes, and the travel information on the direction of the way point (i.e., the way point direction), which is located around that current place indicating icon a and set by the user, are displayed as the major display items.

The travel information is composed of a plurality of breakpoint marks dividing the predetermined angle range at least in front of the traveling direction around the current place and capable of indicating the way point direction. In FIG. 6, the predetermined angle range is set to the leftward and rightward 90 degrees in front of the traveling direction around the current place and is divided by eight into nine breakpoint marks i, which are shaped into bright (or luminescent) dots arranged in islands. In short, the travel information is formed in the separate shapes.

Moreover, each of the breakpoint marks i has a region of leftward and rightward 11.25 degrees. In case the way point direction is contained in this region, the marks change into way point direction indicating and breakpoint marks j, which are shaped into dark (or unluminescent) dots and indicate the way point direction (FIG. 6(a)).

As a result, the relation between the traveling direction and the way point can be known at the unit of one quarter of 90 degrees.

With this construction, by observing the position of the way point direction indicating and breakpoint marks j in the screen X, the relation between the traveling direction and the way point can be easily recognized to improve the visibility, so that the user does not stray but can grasp the direction to be taken, intuitively and easily.

By making the adjacent two of the breakpoint marks i into the way point direction indicating and breakpoint marks j, moreover, it is possible to indicate that the way point is located between those two marks j. In other words, a display mode like that of the divided indications at the unit of 11.25 degrees (i.e., one eighth of 90 degrees) can be realized to enhance the display resolution (FIG. 6(b)).

The present invention should not be limited to the foregoing embodiments but can be modified in various manners. In FIG. 5, for example, the dividing number of the scale g constructing the azimuth information can be arbitrarily set, and the current place indicating icon a need not be laid over the scale g but may be displayed near the scale g.

Figure 7:
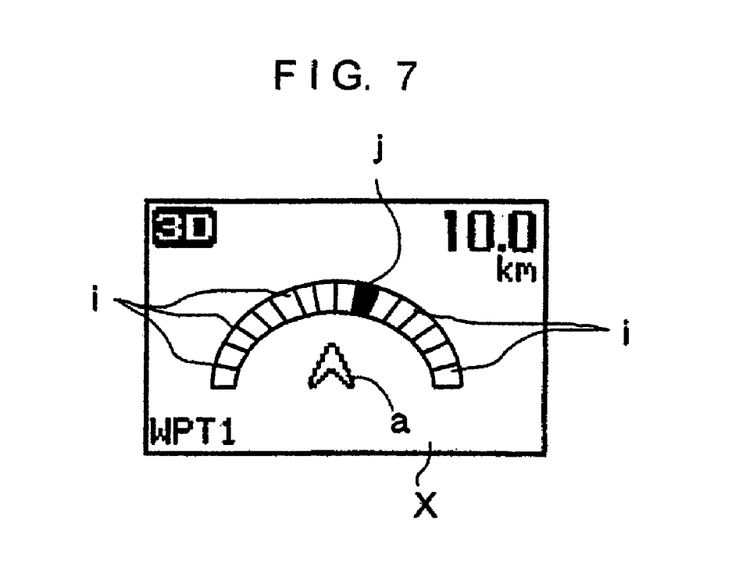

In FIG. 6, moreover, the shape and number of the breakpoint marks i and j can be arbitrarily set, and the travel information need not be separated, as shown in FIG. 6, but may be formed into a continuous band shape (as referred to FIG. 7).

INDUSTRIAL APPLICABILITY

The present invention is suitable for the navigation system to be utilized for guiding a mover such as a human being or a vehicle, and can provide a navigation system improved in visibility and conveniences.

The invention claimed is:

1. A navigation system comprising: a processor and a display unit, characterized in that a current place indicating icon for indicating the current place of a user, a used road image for indicating a used road being followed by the user, an option road image for indicating an option road connected to said used road and located in front of said current place in the traveling direction, in a display shape different from that of said used road image, and a way point indicating icon for indicating a way point set by said user and located in front of said current place in the traveling direction are displayed in a common screen; in that said way point indicating icon moves toward a predetermined portion of the screen, as said current place approaches said way point, and stands still at said predetermined portion; and in that said current place indicating icon then moves on said used road image toward said way point indicating icon.

2. A navigation system as set forth in claim 1, characterized in that, in case the distance between said current place and said way point comes within a predetermined distance, the way point indicating icon is fixed and displayed at a predetermined portion of said screen.

3. A navigation system as set forth in claim 1, characterized in that, when said current place passes through said way point, said current place indicating icon is displayed at the indication of said way point passage until a predetermined time period or a predetermined distance passes.

4. A navigation system as set forth in claim 1, characterized in that, in case said current place departs from said used road, a locus image indicating a history of said current place is displayed at the back of said current place indicating icon.

5. A navigation system as set forth in claim 4, characterized in that the display mode of said screen of the case, in which said current place deviates from said used road, is different from that of the case, in which said user is moving on said used road.

6. A navigation system comprising: a processor and a display unit, characterized in that a current place indicating icon for indicating the current place of a user, a used road image for indicating a used road being followed by the user, an option road image for indicating an option road connected to said used road and located in front of said current place in the traveling direction in a display shape different from that of said used road image, and a way point indicating icon for indicating a way point set by said user and located in front of said current place in the traveling direction are displayed in a common screen, wherein when said current place departs from said used road, a locus image indicating a history of said current place is displayed at the back of said current place indicating icon, and the display mode of said screen when said current place deviates from said used road is different from that when said user is moving on said used road.

* * * * *